Dec. 25, 1923.
Z. A. DAVISSON
VEHICLE BRAKE
Filed Feb. 9, 1921
1,478,641
2 Sheets-Sheet 1
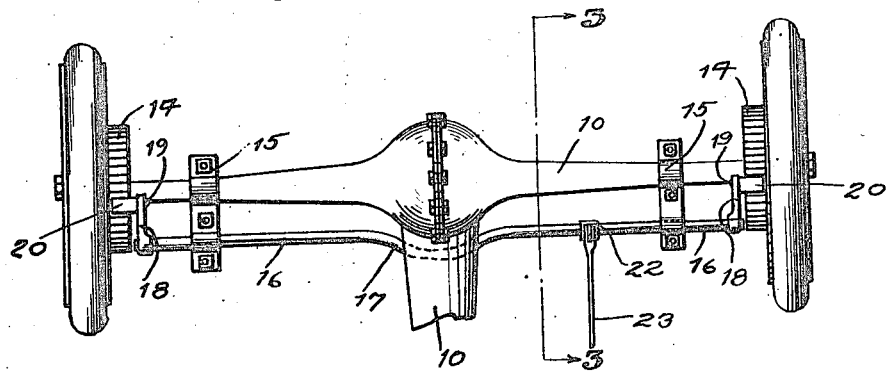
Fig. 1.
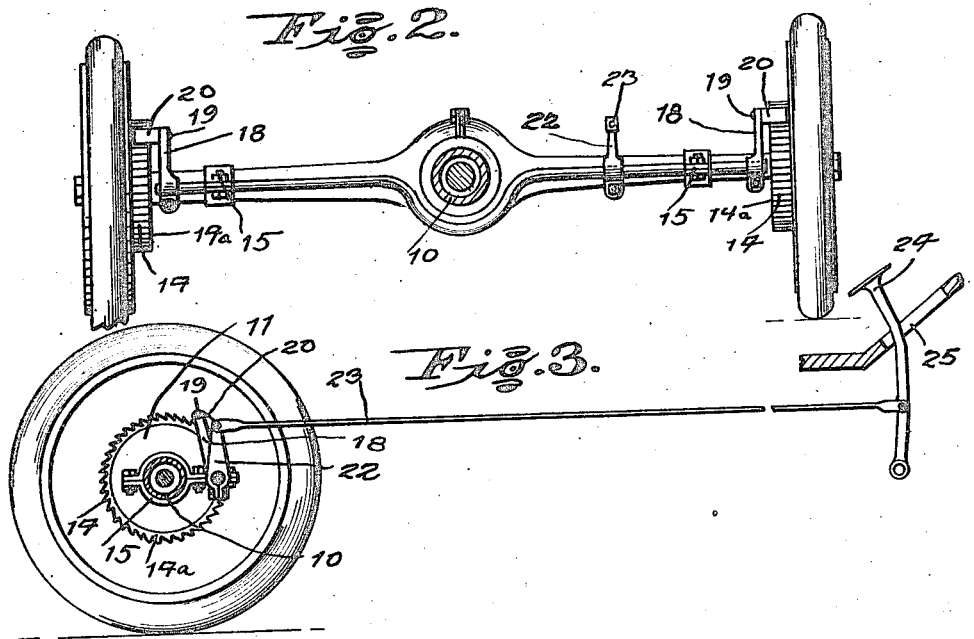
Fig. 2.
Fig. 3.
Z. A. Davisson, INVENTOR.
BY Watson E. Coleman, ATTORNEY.

Dec. 25, 1923.
Z. A. DAVISSON
VEHICLE BRAKE
Filed Feb. 9, 1921
1,478,641
2 Sheets-Sheet 2
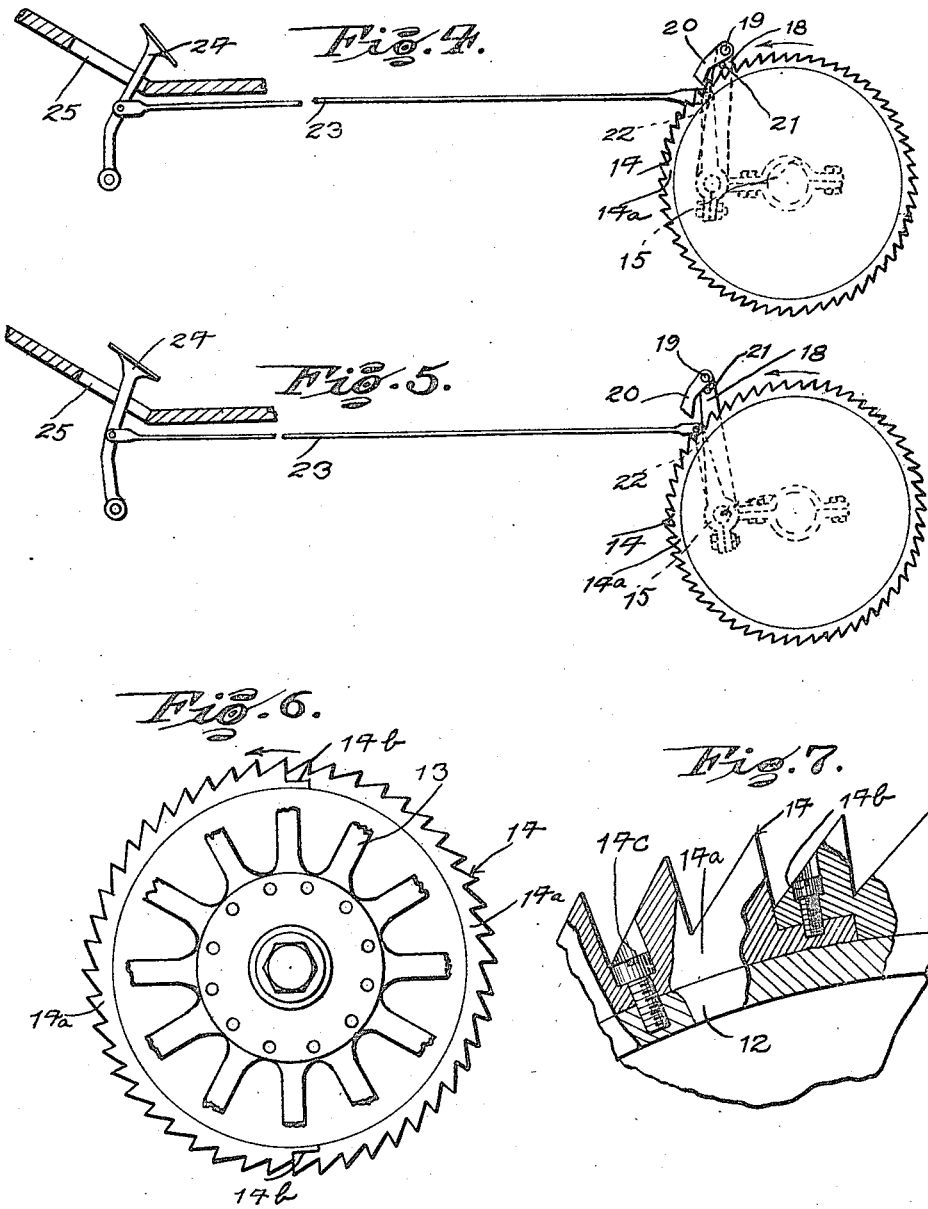

Patented Dec. 25, 1923.

1,478,641

UNITED STATES PATENT OFFICE.

ZADOK A. DAVISSON, OF CLARKSBURG, WEST VIRGINIA.

VEHICLE BRAKE.

Application filed February 9, 1921. Serial No. 443,587.

*To all whom it may concern:*

Be it known that I, ZADOK A. DAVISSON, a citizen of the United States, residing at Clarksburg, in the county of Harrison and State of West Virginia, have invented certain new and useful Improvements in Vehicle Brakes, of which the following is a specification, reference being had to the accompanying drawings.

This invention relates to improvements in vehicle brakes and more particularly to a device adapted to prevent reverse motion of the vehicle.

An important object of the invention is to provide means for automatically locking the wheels of a vehicle against movement in event of some accident causing the vehicle to move rearwardly, as for example failure of the brakes when the car is facing upwardly on a steep grade.

A further object of the invention is to provide a device of this character which may be very cheaply constructed and which may be easily and quickly attached to a vehicle.

Other objects and advantages of the invention will become apparent throughout the course of the following description:

In the accompanying drawings wherein for the purpose of illustration is shown a preferred embodiment of my invention and wherein like reference characters designate like parts throughout, Figure 1 is a fragmentary plan view showing a brake apparatus constructed in accordance with my invention applied to an automobile;

Figure 2 is a front elevation thereof;

Figure 3 is a section on the line 3—3 of Figure 1;

Figure 4 is a side elevation thereof;

Figure 5 is a similar view showing the ratchet mechanism in disengaged position;

Figure 6 is a detail view showing the construction of the ratchet ring, and

Figure 7 is an enlarged detail view showing the manner of securing the sections of the ratchet ring together and to the brake drum flange.

Referring now more particularly to the drawings, the numeral 10 indicates the rear axle housing of a vehicle which has secured thereto a brake housing plate 11. This plate co-acts with the flange 12 of a second plate secured to the wheel 13 to form a housing for the brake mechanism of the vehicle. In accordance with my invention I mount upon this flange 12 which rotates with the wheel 13, an annular ring 14 having the outer face thereof provided with ratchet teeth. This ring is composed of a pair of similar complementary sections 14ª secured together as at 14ᵇ and secured to the flange 12 in any suitable manner, as for example by means of set screws 14ᶜ.

In accordance with my invention I mount upon the rear axle housing brackets 15 extending forwardly from the housing and having in their forward ends bearings adapted for the reception of shaft 16 paralleling the axle housing alining with the horizontal axis of the brake drum flange 12, the shaft being provided centrally with an offset bend 17 preventing its engagement with the drive shaft of the vehicle.

To the ends of the shaft 16 are secured substantially vertically extending arms 18, each having mounted in the free end thereof a pivot pin 19 overhanging the ratchet teeth of the ring 14. Upon these pivot pins are mounted dogs 20 adapted to normally engage in the teeth of the ring 14 to permit rotation thereof in a direction necessary to travel of the vehicle in a forward direction but preventing rotation thereof in a direction thereof necessary to reverse motion. The arms 18 are each provided with a lug 21 adapted to engage the dog 20 to limit the outward movement thereof.

Secured to the shaft 16 is an arm 22 having pivotally connected to the free end thereof a link 23. The numeral 24 designates a reverse mechanism control member in the present instance disclosed as the pedal operating within a slot 25, the pedal being at the limit of its movement at the rear end of the slot and having connected thereto the forward end of the link 23.

In the operation of my device during the normal travel of the vehicle the pawl 20 slides upon the teeth of the ring 14 and in no manner interferes with the operation of the vehicle. If, however, the brakes upon the vehicle fail and the vehicle starts to move in a reverse direction the pawl 20 locks in the teeth of the ring holding the wheels against movement, since the strain placed upon the pawl will tend to rotate the shaft in a direction to move the arm 22 and link 23 rearwardly, and such rearward movement is prevented by reason of the fact that the reverse control member 24 is at the rear limit of its movement. When it is desired to put the vehicle in reverse, movement of the pedal 24 to place the reverse mechanism in operative engagement will cause the shaft 16 to oscillate, swinging the pawl 20 out of path of the teeth and permitting free reverse motion of the vehicle. It will be understood that while the reverse control member is herein disclosed as a pedal, that this reverse control member may be of any desired construction, the only limiting factor being that the arm 22 must be so disposed that when the reverse mechanism is in disengaged position the pawl 20 will be in engagement with the teeth of the ring 14. In other words, if the reverse control member 24 were in disengaged position at the forward limit of its travel then the arm 22 instead of being secured to the shaft 16 so that it extends in substantially the same direction as the arm 18, would be secured to the shaft 16 so that it extends therefrom in the opposite direction from the arm 18, so that as the reverse control member is moved into operative position the pawl 20 is moved into inoperative position.

From the foregoing it is believed to be obvious that I have constructed a brake mechanism for vehicles which is particularly well adapted for use in that it positively locks a vehicle against inadvertent reverse movement and in that the construction employed is of such a simple nature that the cost of manufacturing the same is reduced to a minimum. It will likewise be obvious that the construction as hereinbefore set forth is capable of some modification without materially departing from the spirit of my invention, and I accordingly do not limit myself to such specific structure except as hereinafter claimed.

What I claim is:

A back stop brake for motor vehicles having a longitudinal drive shaft and a rear driven axle geared together centrally of the rear axle, and wherein driven supporting wheels are fixed to the ends of the rear axle and a housing is provided for the rear axle and the gearing between said rear axle and the drive shaft, comprising brackets mounted upon the rear axle housing at each side of the drive shaft and projecting forwardly from said housing with bearings in their forward free ends, a transverse rock shaft journaled in the bracket bearings directly in front of the rear axle and having an offset central portion extending under the longitudinal drive shaft, arms secured to and extending upwardly from the ends of the transverse rock shaft inwardly of the driven supporting wheels, rings fixed to the inner sides of the supporting wheels and both having rearwardly facing ratchet teeth, pawls pivoted to the upper ends of said arms and both depending in forwardly and downwardly inclined position with their lower ends both engaging the teeth of said rings forwardly of the axes of the rings to prevent retrograde or backward rotation of the supporting wheels, means to limit downward swinging movement of the pawls to a point where they are forwardly and downwardly inclined, a third arm secured to and extending upwardly from the transverse rock shaft inwardly of one of said brackets, and a link to connect said last named arm to the gear shift lever of the vehicle whereby the arms and pawls are swung forwardly and disengaged from said ratchet teeth when the transverse shaft is rocked by movement of the gear shift lever to reversing position.

In testimony whereof I hereunto affix my signature.

ZADOK A. DAVISSON.